(12) United States Patent
Vänskä et al.

(10) Patent No.: US 7,130,622 B2
(45) Date of Patent: *Oct. 31, 2006

(54) DISPOSABLE MINI-APPLICATIONS

(75) Inventors: Marko Vänskä, Espoo (FI); Sami Ranta, Helsinki (FI); Raimo Malila, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/143,314

(22) Filed: Jun. 1, 2005

(65) Prior Publication Data

US 2005/0222918 A1    Oct. 6, 2005

Related U.S. Application Data

(63) Continuation of application No. 10/286,221, filed on Nov. 1, 2002, now Pat. No. 7,072,672.

(51) Int. Cl.
*H04Q 7/20* (2006.01)

(52) U.S. Cl. .................. 455/419; 455/414.1; 455/418; 455/456.3

(58) Field of Classification Search ............. 455/412.1, 455/412.2, 414.1, 414.2, 418, 419, 422.1, 455/426.1, 426.2, 432.3, 456.1, 456.3; 707/1–10, 707/100; 345/737–739; 705/1–10, 26, 200–208
See application file for complete search history.

(56) References Cited

U.S. PATENT DOCUMENTS

| | | | |
|---|---|---|---|
| 3,916,160 A | 10/1975 | Russo et al. | |
| 3,971,917 A | 7/1976 | Maddox et al. | |
| 4,692,603 A | 9/1987 | Brass et al. | |
| 4,728,783 A | 3/1988 | Brass et al. | |
| 4,745,269 A | 5/1988 | Van Gils | |
| 4,754,127 A | 6/1988 | Brass et al. | |
| 4,782,221 A | 11/1988 | Brass et al. | |
| 4,794,239 A | 12/1988 | Allais | |
| 4,874,936 A | 10/1989 | Chandler et al. | |
| 4,896,029 A | 1/1990 | Chandler et al. | |
| 4,924,078 A | 5/1990 | Sant'Anselmo et al. | |
| 4,939,354 A | 7/1990 | Priddy et al. | |
| 4,958,064 A | 9/1990 | Kirkpatrick | |
| 4,972,475 A | 11/1990 | Sant'Anselmo et al. | |
| 4,998,010 A | 3/1991 | Chandler et al. | |

(Continued)

FOREIGN PATENT DOCUMENTS

DE   10042914   4/2001

(Continued)

OTHER PUBLICATIONS

"CodeXML Router—Bluetooth Edition", http//www.gocode.com/products/coderouter.htm, 2 pages, printed on Jul. 2, 2004.

(Continued)

*Primary Examiner*—Jean Gelin
(74) *Attorney, Agent, or Firm*—Morgan & Finnegan, L.L.P.

(57) ABSTRACT

Disposable mini-applications are executable software items whose activation, deactivation and deletion in a mobile terminal are defined by trigger parameters and rules. Trigger parameters may include, but are not intended to be limited to, location, time, stored user data and the like. Rules are one or more trigger parameters needed to effect one of the foregoing actions. In one embodiment, a housekeeping means monitors for data that corresponds to the parameters and satisfies the rules, and performs a variety of housekeeping functions relating to the disposable mini-applications. The deletion of the disposable mini-application clears memory space associated with storing and executing the disposable mini-application, and thus, makes that space available for other purposes.

57 Claims, 6 Drawing Sheets

U.S. PATENT DOCUMENTS

| | | |
|---|---|---|
| 5,053,609 A | 10/1991 | Priddy et al. |
| 5,118,369 A | 6/1992 | Shamir |
| 5,124,536 A | 6/1992 | Priddy et al. |
| 5,153,148 A | 10/1992 | Sakiyama et al. |
| 5,189,292 A | 2/1993 | Batterman et al. |
| 5,206,490 A | 4/1993 | Petigrew et al. |
| 5,223,701 A | 6/1993 | Batterman et al. |
| 5,243,655 A | 9/1993 | Wang |
| 5,250,789 A | 10/1993 | Jonsen |
| 5,331,176 A | 7/1994 | Sant'Anselmo et al. |
| 5,369,261 A | 11/1994 | Shamir |
| 5,378,883 A | 1/1995 | Batterman et al. |
| 5,412,193 A | 5/1995 | Swartz et al. |
| 5,415,167 A | 5/1995 | Wilk |
| 5,449,895 A | 9/1995 | Hecht et al. |
| 5,478,989 A | 12/1995 | Shepley |
| 5,493,692 A | 2/1996 | Theimer et al. |
| 5,508,695 A | 4/1996 | Nelson et al. |
| 5,512,739 A | 4/1996 | Chandler et al. |
| 5,521,372 A | 5/1996 | Hecht et al. |
| 5,550,535 A | 8/1996 | Park |
| 5,559,707 A | 9/1996 | DeLorme et al. |
| 5,561,702 A | 10/1996 | Lipp et al. |
| 5,561,705 A | 10/1996 | Allard et al. |
| 5,572,653 A | 11/1996 | DeTemple et al. |
| 5,591,956 A | 1/1997 | Longacre, Jr. et al. |
| 5,592,375 A | 1/1997 | Salmon et al. |
| 5,612,524 A | 3/1997 | Sant'Anselmo et al. |
| 5,629,981 A | 5/1997 | Nerlikar |
| 5,630,068 A | 5/1997 | Vela et al. |
| 5,642,303 A | 6/1997 | Small et al. |
| 5,649,114 A | 7/1997 | Deaton et al. |
| 5,649,187 A | 7/1997 | Honbuckle |
| 5,666,214 A | 9/1997 | MacKinlay et al. |
| 5,682,142 A | 10/1997 | Loosmore et al. |
| 5,715,314 A | 2/1998 | Payne et al. |
| 5,729,697 A | 3/1998 | Schkolnick et al. |
| 5,732,229 A | 3/1998 | Dickinson |
| 5,764,736 A | 6/1998 | Shachar et al. |
| 5,764,739 A | 6/1998 | Patton et al. |
| 5,794,142 A | 8/1998 | Vanttila et al. |
| 5,799,091 A | 8/1998 | Lodenius |
| 5,811,776 A | 9/1998 | Liiu |
| 5,821,513 A | 10/1998 | O'Hagan et al. |
| 5,850,187 A | 12/1998 | Carrender et al. |
| 5,886,646 A | 3/1999 | Watanabe et al. |
| 5,933,829 A | 8/1999 | Durst et al. |
| 5,948,040 A | 9/1999 | DeLorme et al. |
| 5,949,335 A | 9/1999 | Maynard |
| 5,959,530 A | 9/1999 | Lupien, Jr. et al. |
| 5,970,469 A | 10/1999 | Scroggie et al. |
| 5,978,773 A | 11/1999 | Hudetz et al. |
| 5,979,757 A | 11/1999 | Tracy et al. |
| 6,023,241 A | 2/2000 | Clapper |
| 6,026,375 A | 2/2000 | Hall et al. |
| 6,029,064 A | 2/2000 | Farris et al. |
| 6,055,442 A | 4/2000 | Dietrich |
| 6,058,304 A | 5/2000 | Callaghan et al. |
| 6,108,656 A | 8/2000 | Durst et al. |
| 6,138,009 A | 10/2000 | Birgerson |
| 6,154,745 A | 11/2000 | Kari et al. |
| 6,176,427 B1 | 1/2001 | Antognini et al. |
| 6,177,860 B1 | 1/2001 | Cromer et al. |
| 6,199,048 B1 | 3/2001 | Hudetz et al. |
| 6,223,988 B1 | 5/2001 | Batterman et al. |
| 6,249,226 B1 | 6/2001 | Harrison et al. |
| 6,259,367 B1 | 7/2001 | Klein |
| 6,295,506 B1 | 9/2001 | Heinonen et al. |
| 6,308,203 B1 | 10/2001 | Itabashi et al. |
| 6,314,457 B1 | 11/2001 | Schena et al. |
| 6,327,570 B1 | 12/2001 | Stevens |
| 6,332,062 B1 | 12/2001 | Phillips et al. |
| 6,356,543 B1 | 3/2002 | Hall et al. |
| 6,370,389 B1 | 4/2002 | Isomursu et al. |
| 6,389,278 B1 | 5/2002 | Singh |
| 6,397,057 B1 | 5/2002 | Malackowski et al. |
| 6,401,085 B1 | 6/2002 | Gershman et al. |
| 6,446,004 B1 | 9/2002 | Cao et al. |
| 6,446,208 B1 | 9/2002 | Gujar et al. |
| 6,448,979 B1 | 9/2002 | Schena et al. |
| 6,456,039 B1 | 9/2002 | Lauper et al. |
| 6,462,660 B1 | 10/2002 | Cannon et al. |
| 6,470,096 B1 | 10/2002 | Davies et al. |
| 6,491,217 B1 | 12/2002 | Catan |
| 6,512,919 B1 | 1/2003 | Ogasawara |
| 6,542,933 B1 | 4/2003 | Durst, Jr. et al. |
| 6,577,901 B1 | 6/2003 | Thompson |
| 6,587,684 B1 | 7/2003 | Hsu et al. |
| 6,611,673 B1 | 8/2003 | Bayley et al. |
| 6,622,017 B1 | 9/2003 | Hoffman |
| 6,641,051 B1 | 11/2003 | Illowsky et al. |
| 6,647,269 B1 | 11/2003 | Hendrey et al. |
| 6,650,761 B1 | 11/2003 | Rodriguez et al. |
| 6,678,425 B1 | 1/2004 | Flores et al. |
| 6,687,793 B1 | 2/2004 | Thomas et al. |
| 6,753,883 B1 | 6/2004 | Schena et al. |
| 6,950,646 B1 * | 9/2005 | Pradhan et al. ............. 455/406 |
| 6,985,562 B1 * | 1/2006 | Matsuda et al. ......... 379/88.06 |
| 6,993,326 B1 * | 1/2006 | Link et al. ............... 455/414.1 |
| 6,996,537 B1 * | 2/2006 | Minear et al. ................ 705/26 |
| 2001/0011247 A1 | 8/2001 | O'Flaherty et al. |
| 2001/0018349 A1 | 8/2001 | Kinnunen et al. |
| 2001/0041566 A1 | 11/2001 | Xanthos et al. |
| 2002/0039909 A1 | 4/2002 | Rankin |
| 2002/0072355 A1 * | 6/2002 | Jeong et al. ................. 455/419 |
| 2002/0086680 A1 | 7/2002 | Hunzinger |
| 2002/0087392 A1 | 7/2002 | Stevens |
| 2002/0087529 A1 | 7/2002 | Dutcher et al. |
| 2002/0094797 A1 | 7/2002 | Marshall et al. |
| 2002/0095456 A1 | 7/2002 | Wensheng |
| 2002/0121544 A1 | 9/2002 | Ito et al. |
| 2002/0122055 A1 | 9/2002 | Parupudi et al. |
| 2002/0130178 A1 | 9/2002 | Wan et al. |
| 2002/0151326 A1 | 10/2002 | Awada et al. |
| 2002/0165008 A1 | 11/2002 | Sashihara et al. |
| 2003/0017848 A1 | 1/2003 | Engstrom et al. |
| 2003/0019929 A1 | 1/2003 | Stewart et al. |
| 2003/0030542 A1 | 2/2003 | Von Hoffman |
| 2003/0056019 A1 | 3/2003 | Kehr et al. |
| 2003/0074566 A1 | 4/2003 | Hypponen |
| 2003/0088496 A1 | 5/2003 | Piotrowski |
| 2003/0191839 A1 | 10/2003 | Seljeseth |
| 2003/0194989 A1 | 10/2003 | Guion |
| 2004/0000585 A1 | 1/2004 | Silverbrook et al. |
| 2004/0006517 A1 * | 1/2004 | Takatori ...................... 705/26 |
| 2004/0033798 A1 * | 2/2004 | Robin et al. ................ 455/419 |
| 2004/0075675 A1 | 4/2004 | Raivisto et al. |
| 2004/0083138 A1 | 4/2004 | Silverbrook et al. |
| 2004/0203693 A1 * | 10/2004 | Mehta et al. ................ 455/419 |

FOREIGN PATENT DOCUMENTS

| | | |
|---|---|---|
| EP | 0801512 | 10/1997 |
| EP | 0853287 | 7/1998 |
| EP | 1059599 | 12/2000 |
| EP | 1130495 | 9/2001 |
| EP | 1130933 | 9/2001 |
| FI | 2002/2288 | 12/2002 |
| GB | 2 246 491 A | 1/1992 |
| WO | WO 97/10558 | 3/1997 |
| WO | WO 97/17790 | 5/1997 |
| WO | WO 97/28736 | 8/1997 |
| WO | WO 97/46960 | 12/1997 |
| WO | WO 98/35469 | 8/1998 |

| | | |
|---|---|---|
| WO | WO 99/17230 | 4/1999 |
| WO | WO 99/30257 | 6/1999 |
| WO | WO 00/16507 | 3/2000 |
| WO | WO 00/74406 | 12/2000 |
| WO | WO 01/06507 | 1/2001 |
| WO | WO 01/17297 | 3/2001 |
| WO | WO 01/20542 | 3/2001 |
| WO | WO 01/25985 | 4/2001 |
| WO | WO 01/39103 | 5/2001 |
| WO | WO 01/39108 | 5/2001 |
| WO | WO 01/45038 | 6/2001 |
| WO | WO 01/45061 A2 | 6/2001 |
| WO | WO 01/45319 | 6/2001 |
| WO | WO 01/47291 | 6/2001 |
| WO | WO 01/73687 | 10/2001 |
| WO | WO 01/74011 | 10/2001 |
| WO | WO 01/75815 | 10/2001 |
| WO | WO 01/99410 | 12/2001 |
| WO | WO 2004/3829 | 1/2004 |
| WO | WO 2004/27689 | 4/2004 |
| WO | WO 2005/101337 A1 | 10/2005 |

OTHER PUBLICATIONS

"CodeXML Bluetooth Modem", product sheets (2 pp), printed from www.gocode.com on Jul. 2, 2004.

"CodeXML Router—Bluetooth Edition", product sheets (2 pp), printed from www.gocode.com on Jul. 2, 2004.

"Code Router BE Diagram", http://www.gocode.com/routerdiagram.htm, 1 page, printed on Jul. 2, 2004.

"CodeXML Maker Pro", http://www.gocode.com/products/maker.htm, 1 page, printed on Jul. 2, 2004.

"CodeXML Maker Pro Screen", http://www.gocode.com/products/images/makerpro-screen.jpg, 1 page, printed on Jul. 2, 2004.

"CodeXML Bluetooth Modem", http://www.gocode.com/products/modem.htm, 1 page, printed on Jul. 2, 2004.

"Code Router BE Use Case Diagram", http://www.gocode.com/routerdiagram2.htm, 1 page, printed on Jul. 2, 2004.

"GoCode—Secure Data Soltions", http://www.gocode.com/products/gocode.htm, 3pp, printed on Jul. 2, 2004.

NeoMedia Technologies Inc., "Patent Infringement Lawsuit Brought by NeoMedia Against AirClic Inc., Scanbuy, Inc., and LScan Technologies Inc.", dated Jan. 26, 2004, 2 pages, http://www.neom.com/corporate/press/2004/20040126.jsp, printed Apr. 15, 2004.

Symbol Technologies Ltd., "Solutions 8 Fastfrog Case Study", http://www.symbol.com/uk/News/solutions_8_fastfrog_case_stud.html, 2 pages, printed on Apr. 15, 2004.

"CueCat Barcode scanner from Digital Convergence Information", http://www.cuecat.com, 2 pages, printed on Sep. 16, 2005.

iTCaseStudies.com "Uniting Space and Place for Future Growth", 4 pages, http://www.itcasestudies.com/case/ret37.html, printed on Apr. 15, 2004.

Stephen Satchell, "CueCat Principles of Operation", 4 pages, http://www.fluent-access.com/wtpapers/cuecat, printed on Apr. 15, 2004.

Symbol Technologies, Inc. "Symbol Technologies' Consumer Scanners Provide Mall Shoppers With Internet Shopping Experience", dated Dec. 6, 1999, 3 pages, http://www.symbol.com/news/pressreleases/press_releases_retail_consumer.html, printed on Apr. 15, 2004.

NeoMedia Technologies, "Virgin Entertainment, Virgin Megstore Online and Virgin Mega Store Are Charged with Patent Infringement by NeoMedia Technologies, Inc. ", dated Jan. 5, 2004, 2 pages, http://www.neom.com/corporate/press/2004/20040105.jsp, printed on Apr. 15, 2004.

12snap UK Ltd. 12snap That's Mobile Marketing, 38 pages, http://www.12snap.com/uk/index2.html, printed on Apr. 15, 2004.

AIM Inc. "Radio Frequency Identifcation RFID—A Basic Primer" White paper, V 1.2, Aug. 23, 2001.

Mandato et al. "CAMP: A context-Aware Mobile Portal", IEEE , vol. 40 No. 1, Jan. 2002, pp. 90-97.

"User's Guide Nokia 6310i" 2002, pp. 1-115, no month listed.

"vCard: The Electronic Business Card", White Paper, webpage [online], IMC, [5 pages retrieved on Feb. 5, 2002]. Retrieved from the Internet: <http://www.imc.org/pdi/vcardwhite.html>.

"vCard Overview", webpage [online], IMC, [3 pages retrieved on Feb. 5, 2002]. Retrieved from the Internet: < http://www.imc.org/pdi//vcardoverview.html>.

"Products Using vCard and vCalendar Technology", webpage [online], IMC [9 pages retrieved on Feb. 5, 2002]. Retrieved from the Internet < http://www.imc.org/pdi/pdiprodslits.html>.

"UMTS and Mobile Computing", Huber et al, Mar. 2002, Artech House Mobile Communication Series, pp. 170-187 and 321-232.

* cited by examiner

DISPOSABLE MINI-APPLICATIONS

This is a continuation of application Ser. No. 10/286,221, filed Nov. 1, 2002, now U.S. Pat. No. 7,072,672.

FIELD OF THE INVENTION

The present invention relates to wireless communications systems in general and, more particularly, to an apparatus and method for efficiently managing the memory of a mobile terminal.

BACKGROUND OF THE INVENTION

Mobile terminals have become ubiquitous. One of the reasons for their popularity is their compact size. Another reason is their ability to run software applications that permit users to perform a variety of enhanced functions, beyond those relating to traditional telephony, while in a mobile environment. Unfortunately, the terminal's small size translates into a limited memory capability for storing applications and associated data, and thus, ultimately imposes limitations on the terminal's functionality. Another problem faced by users of mobile terminals equipped with software applications that provide enhanced functionality is having to ensure that they have the latest or most suitable versions of the applications stored on their terminals by manually updating or reconfiguring the applications. What is needed is a mechanism for efficiently managing software applications used by these mobile terminals and, more particularly, for efficiently managing a mobile terminal's memory space where applications are stored.

SUMMARY OF THE INVENTION

The above-identified problems are solved and a technical advance is achieved in the art by an apparatus and method for managing the storage of disposable mini-applications in a mobile terminal, such as a mobile telephone. An application, which comprises an executable software item of limited operability associated with conditions for one or more of downloading, activating, deactivating and deleting the software item, is referred to herein as a disposable mini-application, as will be discussed in detail hereinafter.

An exemplary method for a mobile terminal having a processor and a memory for processing and storing data to manage storage of executable software items of limited operability comprises: downloading an executable software item comprising at least one condition for deletion of the executable software item over a wireless connection, wherein the executable software item enables access to at least one service at a specified location; storing the executable software item including the condition for deletion of the executable software item in storage of the mobile terminal; and if the condition for deletion of the executable software item is satisfied, deleting the executable software item from storage of the mobile terminal.

In an alternate embodiment, an exemplary method comprises: downloading an executable software item together with trigger conditions for activation and deletion of the executable software item over a wireless connection, wherein the executable software item enables access to at least one service at a specified location; storing the executable software item together with the trigger conditions for activation and deletion of the executable software item in storage of the mobile terminal; if a trigger condition for activation of the executable software item is satisfied, activating the executable software item; and if a trigger condition for deletion of the executable software item is satisfied, deleting the executable software item from storage of the mobile terminal.

In yet an alternate embodiment, an exemplary method comprises: downloading a first executable software item upon entry of the mobile terminal into a first location together with a trigger condition for deletion of the first executable software item; downloading a second executable software item upon entry of the mobile terminal into a second location together with a trigger condition for deletion of the second executable software item; monitoring for trigger data that satisfies the trigger condition for deletion of the second executable software item; and deleting the second executable software item upon detection of trigger data that satisfies the trigger condition for deletion of the second executable software item.

In an embodiment directed to a method for a mobile terminal having a processor and a memory for processing and storing data to manage storage of an executable software item of limited operability that provides a user of the mobile terminal with shopping assistance, an exemplary method comprises: downloading an executable software item for providing a user of a mobile terminal with assistance while shopping, wherein the executable software item comprises data comprising an identification of one or more shopping service locations and trigger conditions for activation and deletion of the executable software item from memory of the mobile terminal; detecting, via a short range wireless connection, that the user is located within proximity of one of the shopping service locations; accessing user data comprising indications of goods and/or services of interest to the user; comparing goods and/or services offered by the shopping service location with the user data to determine whether there is a match; if there is a match, activating the executable software item; and executing the executable software item, wherein execution of the executable software item comprises: generating a query for transmission to the shopping service location, the query including the user data; and transmitting the query to the shopping service location via a short range wireless connection. In this embodiment, a shopping service location may be a service desk, a shop or the like in a shopping center/mall or any smaller location therein including an aisle, shelf, counter, stand, etc. where goods and/or services are made available for consumption, as will be discussed in detail hereinafter.

In one embodiment of the present invention, the data or the individual data items mentioned above that are stored in the mobile terminal, such as user data and the data relating to trigger parameters and trigger conditions downloaded to the mobile terminal or stored therein, may be expressed using markup language expressions or compressed markup language expressions of an XML-based markup language.

Other and further aspects of the present invention will become apparent during the course of the following description and by reference to the attached drawings.

DETAILED DESCRIPTION

In the following description of the various embodiments, reference is made to the accompanying drawings which form a part hereof, and in which are shown by way of illustration various embodiments in which the invention may be practiced. It is to be understood that other embodiments may be utilized and structural and functional modifications may be made without departing from the scope of the present invention.

Figure 1:
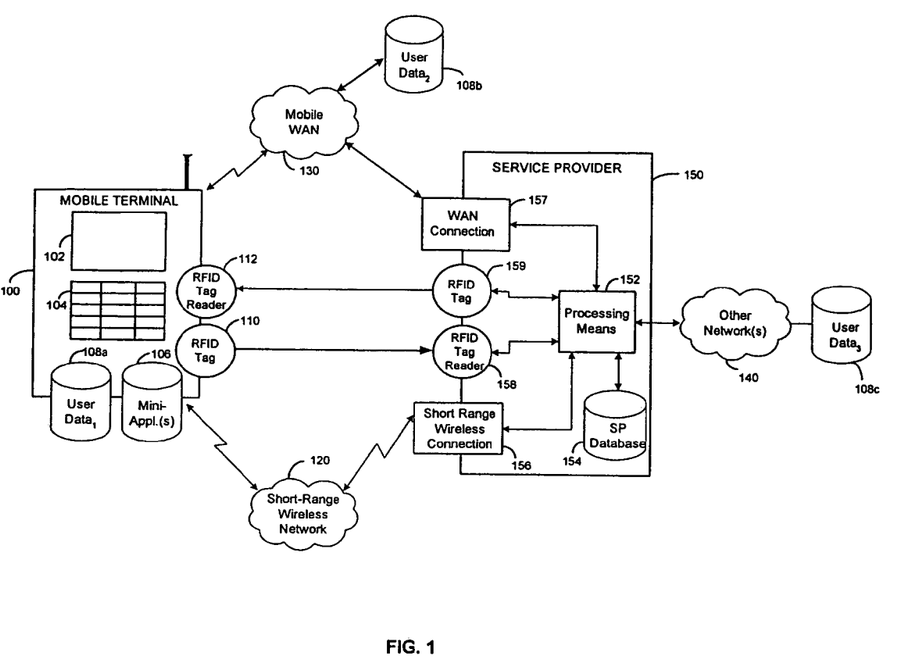
FIG. 1 is a block diagram illustrating an exemplary arrangement between a mobile terminal and a service provider in which a disposable mini-application may be downloaded and used in accordance with one embodiment of the present invention.

FIG. 1 is a block diagram illustrating an exemplary arrangement between a mobile terminal and a service provider in which a disposable mini-application may be downloaded and used in accordance with one embodiment of the present invention. As shown in FIG. 1, mobile terminal 100, which may be a hand-held wireless telephone, a mobile handset terminal, a personal digital assistant ("PDA"), a portable computer or the like includes storage 106 for one or more disposable mini-applications downloaded from a service provider 150, preferably over a wireless connection.

A disposable mini-application is an executable software item, such as a Java applet, a script or a software agent of limited operability for performing one or more functions on a mobile terminal 100. With respect to its limited operability, in addition to being associated with one or more conditions for its deletion, a disposable mini-application is preferably also associated with one or more conditions (such as the physical location of the mobile terminal) for one or more of its downloading, activation and deactivation, as will be discussed in detail hereinafter.

Mobile terminal 100 may download a disposable mini-application from service provider 150 over either a short range wireless network 120, such as a Personal Area Network (e.g., IrDA or Bluetooth PANs) or a wireless LAN (e.g., wireless IEEE 1394, IEEE 802.11 or HiperLAN/2) or a mobile WAN 130 (e.g. GPRS, GSM, etc.). In this regard, service provider 150 includes a short range wireless connection 156 and/or WAN connection 157 for use in downloading a disposable mini-application to mobile terminal 100 over short range wireless network 120 or mobile WAN 130, respectively. Service provider 150, which may be a single entity, such as a single store, or an entity representing a plurality of stores, such as a shopping mall, includes a processor 152 coupled to a data base 154 for storing one or more disposable mini-applications (together with any associated data) for downloading to mobile terminal 100 for activation and use.

In accordance with one embodiment of the present invention, a mobile terminal 100 may download a disposable mini-application provided that any preconditions for downloading it that have been established by either terminal 100 or service provider 150 have been satisfied, as will be discussed in detail hereinafter in connection with FIG. 4. Once downloaded, the disposable mini-application may be activated, deactivated and/or deleted from storage 106 based on whether trigger conditions for doing so have been satisfied, as will also be discussed in detail in connection with FIG. 4. These trigger conditions are preferably downloaded together with the disposable mini-application from service provider 150. In one embodiment, a trigger condition may comprise trigger parameters and rules, as will be discussed in detail hereinafter. The downloaded trigger conditions, trigger parameters and rules may be expressed using markup language expressions or compressed markup language expressions preferably using an XML-based markup language.

Briefly, trigger parameters may be based upon one or more of a location, a date/time, user input, etc. Trigger parameters also may be based upon personal user data such as profile, calendar, intents and notes data. A user's profile may include a user's name, address, phone number(s), gender, age, employer, hobbies, car model, car registration number, preferences (e.g., a preferred genre of books), loyalty card memberships, credit/debit card information and the like. A user's calendar stores user generated entries for events such as appointments, birthdays, visits, holidays, vacations, shows, etc. correlated to a date and time when the event is to occur. A user's intentions may be user-specified intended tasks or acts to be performed by her such as "grocery shopping", "birthday present shopping", "car wash", "hair cut", etc. Notes may include user-generated instructions to be followed by the user when performing a task. Exemplary notes include a shopping list, a wish list for a family member, a spouse's perfume or cologne preferences, etc. Preferably, the user may activate these intents/notes at any time for a period of time (such as from now until otherwise indicated) or can associate them with a date/time in a calendar or to a location for automatic activation. In any event, such personal data may be stored either locally in user data storage 108a or remotely in user data storage 108b where mobile terminal 100 may readily access it whenever needed over, e.g., mobile WAN 130, for use in determining whether trigger parameters associated with a disposable mini-application have been satisfied. The data relating to personal user data may be stored using markup language expressions or compressed markup language expressions, preferably using an XML-based markup language.

As mentioned above, in one embodiment of the present invention, trigger conditions may comprise rules in addition to trigger parameters. Rules are one or more trigger parameters needed to effect an action such as activating, deactivating or deleting a disposable mini-application, as will also be discussed in detail hereinafter.

As further shown in FIG. 1, mobile terminal 100 includes an RF-ID tag 110 and an RF-ID tag reader 112. Service provider 150 likewise includes RF-ID tag readers 158 and RF-ID tags 159. As will be discussed in detail hereinafter, an RF-ID wireless system comprising an RF-ID tag 110 of mobile terminal 100 and RF-ID tag readers 158 of service provider 150 or, alternatively, an RF-ID tag reader 112 of mobile terminal 100 and RF-ID tags 159 of service provider 150, may be used in one embodiment of the present invention to determine the user's location within a service provider 150's premises for use in satisfying a precondition for downloading a disposable mini-application or, satisfying a trigger condition for activating, deactivating and/or deleting the disposable mini-application.

An RF-ID tag is a wireless transponder that may contain varying amounts of information ranging from a tag identifier to 128 Kbytes of variable memory that can be programmed with additional information. An RF-ID tag reader communicates with a tag through the use of RF energy. In particular, an RF-ID tag reader sends out an interrogation signal which "wakes up" a tag situated within a predetermined proximity to the reader. A tag may be "passive" in that it operates without an internal battery source, deriving the power to operate from the RF field generated by the RF-ID reader, which is inductively coupled to the tag. Alternatively, a tag may be "active", and thus, powered by an internal battery that allows a greater communication range and higher data transmission rates. Once interrogated, the tag will transmit a signal including its ID number and possibly other information back to the RF-ID tag reader. RF-ID wireless network principles are described in a publication entitled "Radio Frequency Identification: A Basic Primer", published by Automatic Identification Manufacturers (AIM), website: (www.aimglobal.org), Aug. 23, 2001, a copy of which is incorporated herein by reference. The data stored in an RF-ID tag may be stored at least partly in a format of a markup language expression of an XML-based markup language.

In one embodiment, service provider 150 may have installed RF-ID tags 159 throughout its premises. Mobile terminal 100 may use its RF-ID tag reader 112 to determine its entrance into, current location within, and departure from, a predetermined area by sensing one or more of service provider 150's RFID tags 159, as will be discussed in detail hereinafter in connection with FIG. 6, and use this location information for downloading, activating, deactivating and/or deleting a disposable mini-application without the mobile terminal 100 having to disclose its location to service provider 150.

Given the foregoing, an exemplary trigger parameter for activation of a mini-application may be the identification number of an RF-ID tag 159 read by RF-ID tag reader 112 of mobile terminal 100. Another trigger parameter may be a specific number, such as the numeral "1", entered by the user via keyboard 104. In view of these trigger parameters, an exemplary rule may be that if the first number of the RF-ID tag's identification number read by RF-ID tag reader 112 is a "1" and the number entered by the user is a "1", then the disposable mini-application is activated.

In an alternate embodiment, service provider 150 may have RF-ID tag readers 158, rather than RF-ID tags 159, installed throughout its premises for use in detecting an RF-ID tag 110 of mobile terminal 100. Service provider 150 associates each tag reader 158 with a location in the premises. Thus, in one embodiment, service provider 150 may use a signal generated by an RF-ID tag 110 that has been detected by an RF-ID tag reader 158 located at the entrance of its premises to detect the user's entry so that a disposable mini-application may be downloaded to terminal 100 via a bi-directional network, such as short range wireless network 120. The signal generated by the RF-ID tag 110 of mobile terminal 100 may include information concerning the user's identity for use in personalizing the disposable mini-application to the user based on data stored locally in service provider data base 154 (e.g., loyalty data and/or the user's past purchasing history) and/or remotely in user data storage 108c. Personalization also may be based upon user data stored in terminal 100 (e.g., in user data storage 108a) that is transmitted to service provider 150 over, e.g., short range wireless network 120.

In this alternate embodiment, RF-ID tag 110 of mobile terminal 100 also may be used to provide the service provider 150 with terminal 100's current location within, and departure from, its premises. In particular, service provider 150 may determine the user's location based on the identity of the RF-ID reader 158 that received the RF-ID tag signal. The service provider 150 may transmit this location information to mobile terminal 100 via network 120 for use in triggering activation, deactivation or deletion of a disposable mini-application, as will be discussed in detail hereinafter in connection with FIG. 4.

Once activated, the disposable mini-application begins executing, during which time it may perform a variety of functions including generating outputs to and, receiving inputs from, user interfaces (102, 104), respectively, of mobile terminal 100. In one embodiment, the user inputs received during execution may be used to formulate inquiries that are transmitted to service provider 150 over, e.g., short range wireless network 120 to request information on goods and/or services, as will be discussed in detail hereinafter in connection with FIG. 6. The service provider 150 may formulate responses to the inquiries based on user data transmitted to it by mobile terminal 100 and/or user data, such as customer loyalty data, stored locally in data base 154 of service provider 150 and/or other user data 108c that is remotely accessible to it via network(s) 140. The data stored in data base 154 of the service provider 150 and/or other user data 108c may be stored at least partly in a format using a markup language expression or a compressed markup language expression of an XML-based markup language.

Ultimately, when the associated trigger conditions are satisfied, the disposable mini-application may be deactivated and/or deleted, as will also be discussed in detail hereinafter in connection with FIG. 4. The deletion of a disposable mini-application means that the application and any copies thereof in the mobile terminal 100 to which it has been downloaded are deleted completely, or at least partly, from the storage location where they reside or are otherwise made non-executable or non-accessible. Trigger conditions for deletion of a disposable mini-application are unconditional limits placed upon its use based on temporal, location-specific and like factors such as a limited number of uses. For example, trigger conditions for deletion may comprise the completion of a task to be performed by the disposable mini-application or the passage of time since the disposable mini-application was downloaded or activated. In the latter case, the time limit may be expressed preferably as elapsed time (e.g., three (3) hours), wherein the disposable mini-application may comprise a time counter that counts up or down until the time limit has been reached thereby triggering deletion.

Figure 2:
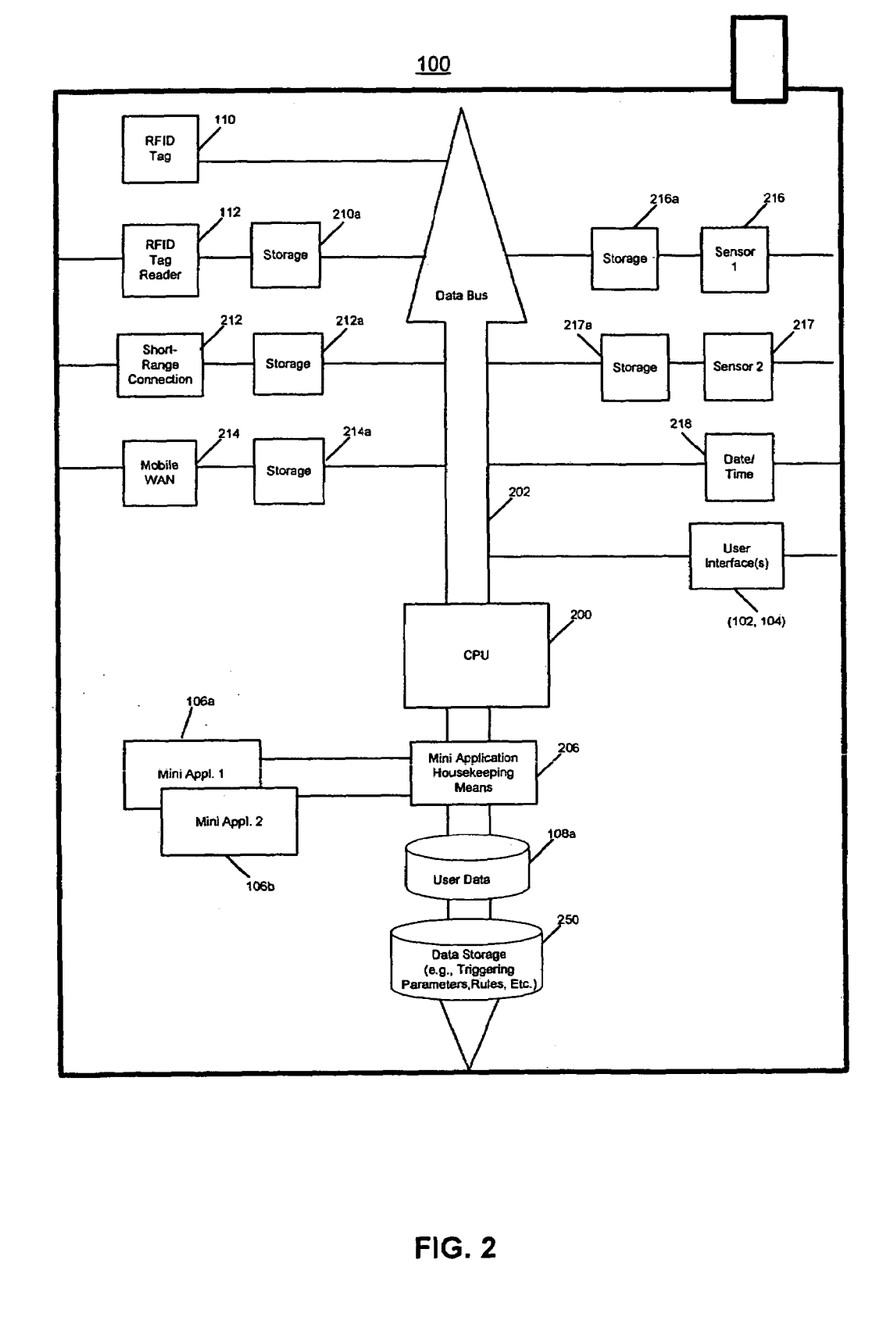
FIG. 2 is a block diagram illustrating an exemplary mobile terminal in accordance with one embodiment of the present invention.

FIG. 2 is a block diagram illustrating an exemplary mobile terminal in accordance with one embodiment of the present invention. As shown in FIG. 2, mobile terminal 100 includes user interfaces (102, 104). Interface 102 may be a display, preferably. one with a touch screen capability, as is well-known in the art. The display 102 preferably is also capable of presenting textual, graphical and/or image data, including animations and video clips, to the user. Interface 104 may be a keypad, which preferably comprises numerous function keys such as alpha-numeric keys and directional (arrow) keys, for permitting a user to perform such functions described herein as generating user inputs in response to prompts, creating and modifying user data, etc. Alternatively, or in addition thereto, a pointing device may be used to manipulate stored and/or displayed data. Moreover, terminal 100 also preferably includes a microphone (not shown) for receiving audio input, such as voice commands. It also preferably includes a speaker(s) and/or an earphone, for audio output (not shown), which, together with display 102, enables the presentation of all media types, such as multimedia service (MMS) messages, to the user of mobile terminal 100.

Terminal 100 also includes a CPU 200 and associated programming for controlling data processing and transfer operations among the various components of terminal 100 via a data transfer bus 202. As shown in FIG. 2, terminal 100 further includes one or more disposable mini-applications 106a, 106b that have been downloaded from one or more service providers 150 using, e.g., short range wireless connection 212 or mobile WAN connection 214. Although only two disposable mini-applications are shown in FIG. 2, it is to be understood that more than two may be stored in terminal 100 provided that there is sufficient memory for doing so. For each disposable mini-application, terminal 100 stores trigger conditions in data storage 250. As mentioned above, these trigger conditions may include trigger parameters and rules that were downloaded with the disposable mini-application for use in determining when activation, deactivation and/or deletion of the associated disposable mini-application is to occur.

Mobile terminal 100 also includes a house-keeping means 206, which, in one embodiment, monitors for trigger data that satisfies trigger parameters and rules associated with the disposable mini-applications (106a, 106b). Mobile terminal 100 includes a variety of sources of trigger data collected from the user's environment for use in determining whether trigger parameters and rules have been satisfied. In addition to the sources discussed above in connection with FIG. 1 (e.g., RF-ID tag 110 and RF-ID tag reader 112 for collecting location information), mobile terminal 100 may include sensors (216, 217), such as a GPS receiver, a bar code reader, a camera, an environmental sensor (e.g., a thermometer) or the like, and a date/time means 218. Trigger data received from these sources may be stored temporarily in storage devices 210a–217a pending analysis by housekeeping means 206 vis-à-vis trigger parameters and rules. In addition to monitoring for such trigger data, housekeeping means 206 also may comprise a user interface to assist the user in downloading, activating, deactivating and deleting disposable mini-applications 106.

Housekeeping means 206 also may perform various other housekeeping functions, such as interfacing disposable mini-applications with the operating characteristics of mobile terminal 100 and supervising and controlling data transfer and processing between input and output data of disposable mini-application 106a and input and output data of mobile terminal 100. Moreover, housekeeping means 206 may itself be a disposable mini-application with trigger conditions associated with its use in mobile terminal 100, as will be discussed in detail hereinafter in connection with FIG. 5.

It will be readily appreciated that mobile terminal 100 also includes conventional hardware and functionality, which may be employed in operating mobile terminal 100 as a mobile phone, but which are well known to those skilled in the art, and thus, are not shown in FIG. 2.

Figure 3:
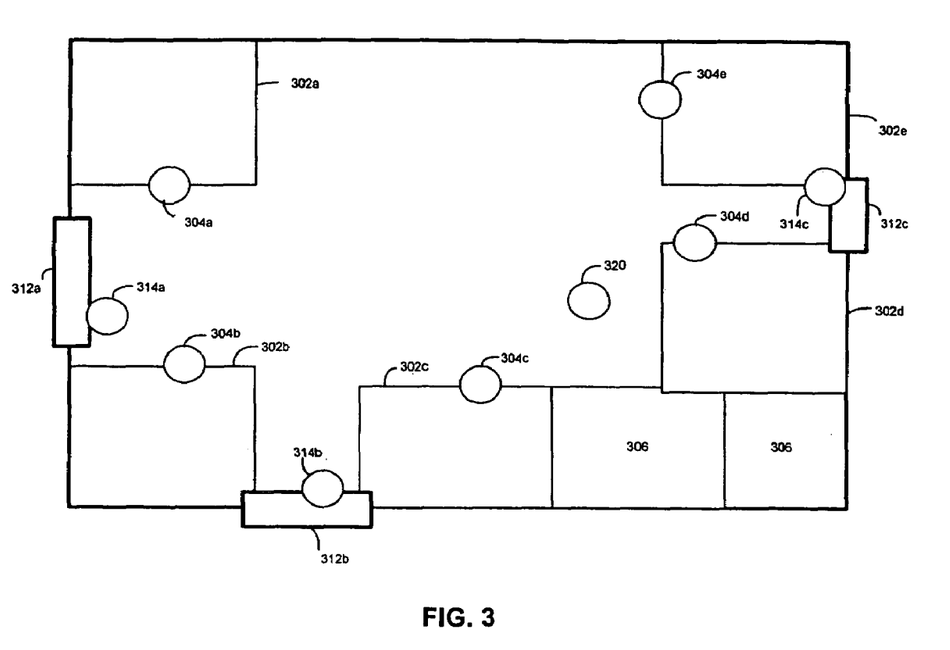
FIG. 3 is a simplified layout of an area such as a shopping mall, department store or shop illustrating the location of nodes for data transfer between mobile terminals and one or more service providers in accordance with one embodiment of the present invention.

FIG. 3 is a simplified layout of an area 300 such as a shopping mall, department store or a shop illustrating the location of nodes for data transfer between one or more service providers and mobile terminals in accordance with one embodiment of the present invention. The shopping mall, department store or shop comprises a plurality of different service points or shopping service locations (302a–e, 306), such as shops in a mall, departments in a department store or service desks in a shop. It is to be understood, however, that the present invention is applicable to other service consumption situations that are a form of shopping such as dining in a restaurant, staying in a hotel, watching a movie or play at a theatre, attending a sporting event, listening to a concert, etc. Common to all these situations is that the user of mobile terminal 100 is at a physical location to which a disposable mini-application may relate. As further shown in FIG. 3, area 300 also has one or more entrances/exits 312a–c, some of which may be used only for entering or exiting area 300 or all of which may be used for both entering and exiting area 300.

Area 300 also is provided with one or more nodes 304a–e, 314a–c and 320 for establishing a data transfer with a mobile terminal 100. Each node may be either a short range wireless connection 156, RF-ID tag readers 158, RF-ID tags 159 or the like or any combination thereof Nodes 314a–c, which are positioned at entrances/exits 312a–c, may be used to detect the entry of the user into, or exit from, area 300 for downloading, activating, deactivating or deleting a disposable mini-application. As shown in FIG. 3, each node 304a–e is associated with a different service point 302a–e, and thus, may be used to detect the entry of the user into, or exit from, the specific areas associated with these service points. As also shown in FIG. 3, node 320 may be, e.g., a kiosk for downloading a disposable mini-application for general information about area 300, such as a map of area 300. Alternatively, or in addition thereto, node 320 also may serve as a common node for a plurality of service points that do not have a dedicated node of their own, such as service points 306.

Figure 4:
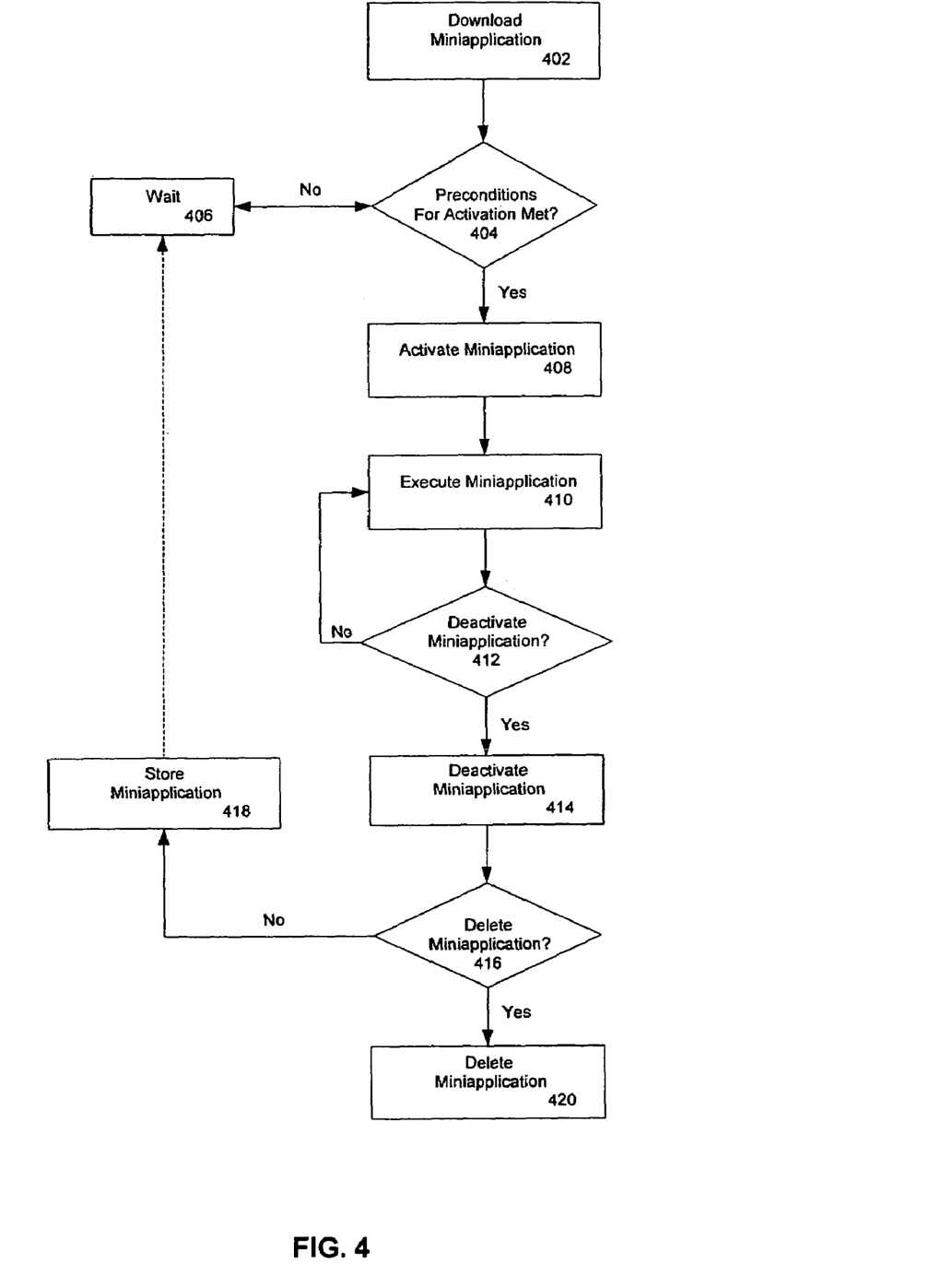
FIG. 4 is a flowchart illustrating an exemplary process by which a disposable mini-application may be used in a mobile terminal.

FIG. 4 is a flowchart illustrating an exemplary process by which a disposable mini-application may be used in a mobile terminal. Before a disposable mini-application may be used, it must first be downloaded to mobile terminal 100. In one embodiment, service provider 150 advises a user of the availability of one or more disposable mini-applications by sending a message to mobile terminal 100 over short range wireless network 120 or mobile WAN 130 using, e.g., SMS/MMS, or by using more conventional forms of advertising media such as leaflets or coupons. The message may include information that the user may need in order to download the disposable mini-application from service provider 150, such as a network address. Also, the message or other forms of advertising may be sent to the user well in advance of mobile terminal 100 reaching a particular location associated with the disposable mini-application or only after the user is in the vicinity of, or at, that location.

Service provider 150 may send this message to mobile terminal 100 based on the user's context, such as her location, a particular instant in time, her current or intended activity or the like, or even any combination thereof. If not transmitted to mobile terminal 100 based on the user's context, then housekeeping means 206 itself may use the user's context comprising one or more of her disclosed profile, calendar, intentions or notes as may be stored in user data 108a of mobile terminal 100 to filter messages concerning the availability of disposable mini-applications for the user. In this manner, housekeeping means 206 may insure that only those disposable mini-applications that are the most relevant to the user are presented to her for downloading.

Additionally, housekeeping means 206 may allow only those disposable mini-applications (or versions thereof) that are compatible with the functional capabilities of the mobile terminal 100 to be downloaded. For example, a disposable mini-application 106 may require that mobile terminal 100 be equipped with minimum memory or processing capabilities, or even other software applications such as a media player, in order for the disposable mini-application 106 to execute properly. Housekeeping means 206 may run a check on the terminal or interrogate the user to determine whether mobile terminal 100 satisfies all of these requirements before downloading the disposable mini-application to local memory. Moreover, housekeeping means 206 also may provide the user with instructions and/or suggestions for satisfying these requirements.

A disposable mini-application 106 that may otherwise be available for downloading may nevertheless include restrictions on downloading or subsequent use. One such restriction may be that the recipient be a registered user of the service provider 150 or that the recipient pay a fee for the download, which, in one embodiment, may be charged upon downloading the disposable mini-application but credited upon purchase of products or services that exceed a predetermined amount. In one embodiment, housekeeping means 206 may enforce these restrictions by soliciting user compliance through a graphical user interface. Moreover, a disposable mini-application may have restrictions on forwarding of the mini-application that are communicated to the user via, e.g., display 102. Such restrictions may be enforced through use of encryption techniques (e.g., digital certificates).

Assuming that all pre-conditions for downloading (if any) have been satisfied, then in step 420 of FIG. 4, the user may download the disposable mini-application to mobile terminal 100. Once downloaded, the disposable mini-application may need to be activated before it can be executed. In one embodiment, this activation is controlled by mini-application housekeeping means 206, which extracts the trigger conditions for activation as well as those for deactivation and deletion from disposable mini-application 106*a*, and then, in steps 404, 412 and 416, respectively, determines whether these trigger conditions have been satisfied.

The trigger conditions for activation may comprise one or more trigger parameters and one or more rules. For example, if the disposable mini-application is intended for use in a certain location, then the current location of the user may be trigger data that satisfies the location trigger parameter. If the rule for activation of the disposable mini-application depends upon not only location data but also user input such as pressing a key on keypad 104 or issuing a voice command to accept the mini-application in response to a prompt from housekeeping means 206 to do so, then the specified user input would be another trigger parameter for which the disposable mini-application housekeeping means 206 would monitor.

Other trigger parameters that may be used either alone or in combination with location data and/or user input data include, but are not limited to, the current date/time, user data, or the identification of the user. With respect to user identification, the user may identify herself, e.g., by presenting her RF-ID tag 110 to the RF-ID tag reader 158 of service provider 150 for comparison with stored user identification information, such as a customer loyalty number. In return, mobile terminal 100 may receive an activation code from service provider 150 over short range wireless network 120 or mobile WAN 130 for activating the mini-application. Mini-application housekeeping means 206 monitors the available sources of trigger data for data that may satisfy an activation trigger parameter and rule, and thus, that may activate a disposable mini-application. These sources of trigger data may include one or more of: user input received via user interfaces (102, 104); data in storage devices 210*a*–217*a* (i.e., data received from RF-ID tag reader 112, short range wireless connection 212, mobile WAN 214 and environmental sensors (216, 217)); the present date/time 218 and data in user data storage 108*a*.

In step 404, if the housekeeping means 206 determines that the trigger conditions for activation have not yet been satisfied then, in step 406, a wait state is entered until the trigger conditions are satisfied. Housekeeping means 206 also may advise the user of the data needed for the activation trigger conditions to be satisfied. Thereafter, in the event that the necessary data is not received within a predetermined period of time, housekeeping mean 206 may delete the disposable mini-application 106*a* from terminal 100. However, once the conditions for activation have been satisfied then, in step 408, the mini-application housekeeping means 206 activates the disposable mini-application 106*a* and, in step 410, the disposable mini-application begins executing.

Depending on the disposable mini-application, execution may comprise processing data, transferring data to and from the mobile terminal via wireless connections (120, 130), displaying data to the user, prompting the user to input or provide access to user data, displaying choices to be made by the user, executing other applications, etc. During execution of disposable mini-application 106, housekeeping means 206 will continue to monitor for user input as well as for data in storage devices 210*a*–217*a* (e.g., location data, etc.), date/time data 218 and user data in storage 108*a* for data that may be needed for the execution of the disposable mini-application as well as for data that will satisfy the trigger parameters and rules for de-activating and deleting disposable mini-application 106. It will be appreciated that once activated, in an alternate embodiment, disposable mini-application 106*a* itself, rather than housekeeping means 206, may monitor for deactivation or deletion trigger data that satisfies associated trigger parameters and rules.

In addition to the foregoing, additional trigger conditions for deactivation and/or deletion also may include: the expiration of a timer value associated with the disposable mini-application; a use counter reaching a maximum number of uses permitted by the disposable mini-application; or, as mentioned above, the passage of a predetermined period of time without the receipt of any data relating to activation or execution of the disposable mini-application. The use counter may be in one embodiment of the present invention a down counter, whereby the counter counts down from a maximum number of uses and the trigger condition is that the counter value reaches zero. Deletion of a disposable mini-application also may occur in response to housekeeping means 206 determining that the mini-application is obsolete, as may be determined upon downloading a more recent version of the application than that currently stored in mobile terminal 100.

If the trigger parameters and rules for deactivation and deletion are satisfied then, in steps 414 and 420, disposable mini-application 106*a* is deactivated and deleted, respectively. Even upon deactivation or deletion of the disposable mini-application, user data generated during execution, such as: data for configuring the disposable mini-application to the user or the mobile terminal 100; the results of the executed disposable mini-application; or data indicative of the user's selections during execution (e.g., her purchasing history), may be retained for future use. For example, this user data may be stored in mobile terminal 100 or, alternatively, in a data base of the service provider, and may be associated with the deleted disposable mini-application for purposes of personalization when either the deleted disposable mini-application or some other disposable mini-application is next downloaded to mobile terminal 100. Thus, in one embodiment, the service provider may identify the mobile terminal 100 upon next encountering it and personalize a disposable mini-application based on the stored user data prior to downloading it to mobile terminal 100. Moreover, personalization may require a user request or acceptance and a monetary fee could be charged therefor.

Returning to FIG. 4, if, however, it is determined in step 416 that the disposable mini-application should not be deleted, then in step 418 the disposable mini-application is maintained in storage and a wait state is entered in step 406 until, in step 404, the stored trigger conditions for activation are once again satisfied.

Figure 5:
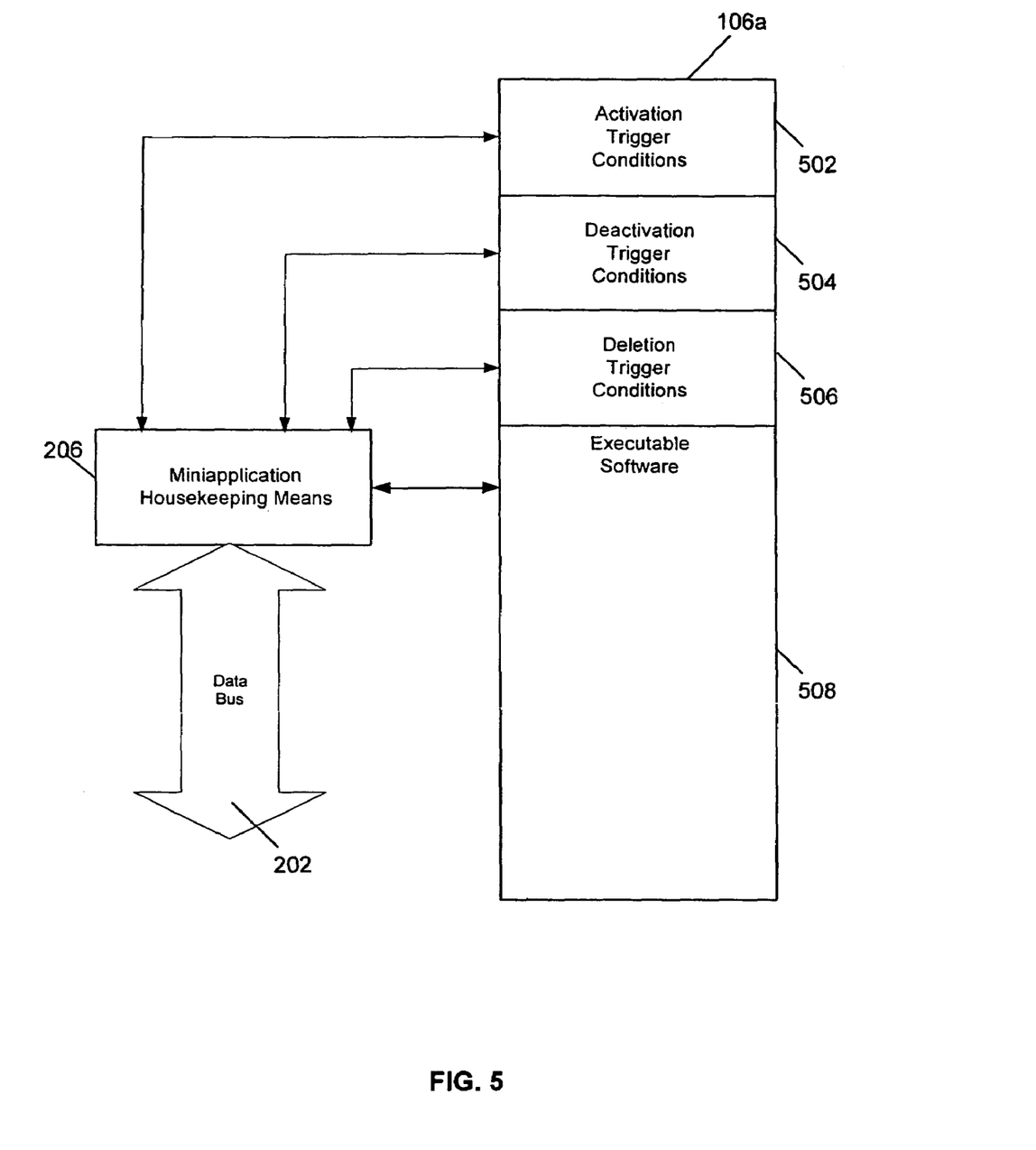
FIG. 5 is a block diagram illustrating the performance of a disposable mini-application housekeeping function.

FIG. 5 is a block diagram illustrating the performance of a disposable mini-application housekeeping function. As shown in FIG. 5, disposable mini-application 106*a* comprises activation trigger conditions 502, de-activation trigger conditions 504, deletion trigger conditions 506 and executable software 508. Housekeeping means 206 may access both disposable mini-application 106*a*'s trigger conditions (502, 504, 506) and executable software 508. In one embodiment, housekeeping means 206 may store the trigger conditions in storage 250 of mobile terminal 100. As shown in FIG. 5, housekeeping means 206 is coupled to data bus 202 and thus may relay data between disposable mini-application 106*a* and the various components of mobile terminal 100 discussed above in detail in connection with FIG. 2 for purposes of collecting trigger data and activating, executing, deactivating and, ultimately, deleting the disposable mini-application from memory.

In addition to interacting with one or more disposable mini-applications, housekeeping means 206 may itself, in one embodiment, be a disposable mini-application and have limitations associated with its use. For example, upon entering a department store, such as area 300 shown in FIG. 3, a user of mobile terminal 100 may download a housekeeping mini-application that is "proprietary" to that store and which controls the downloading, activation, execution, deactivation and deletion of other disposable mini-applications that are available only in that store.

Once downloaded and automatically activated, the housekeeping mini-application may download other disposable mini-applications from service provider 150 that are relevant to the user's context, such as her disclosed profile, calendar, intentions or notes, as may be indicated by data stored, e.g., in user data storage 108*a*, or that are relevant to mobile terminal 100's capabilities. The housekeeping mini-application also may advise the user of the other disposable mini-applications that are available and permit the user to select one or more of them for downloading and use. When the user exits the store, however, the housekeeping mini-application 106*a* may delete all of the downloaded mini-applications relating to that store and finally may delete itself to conserve memory space in mobile terminal 100 which then can be used for other purposes.

Figure 6:
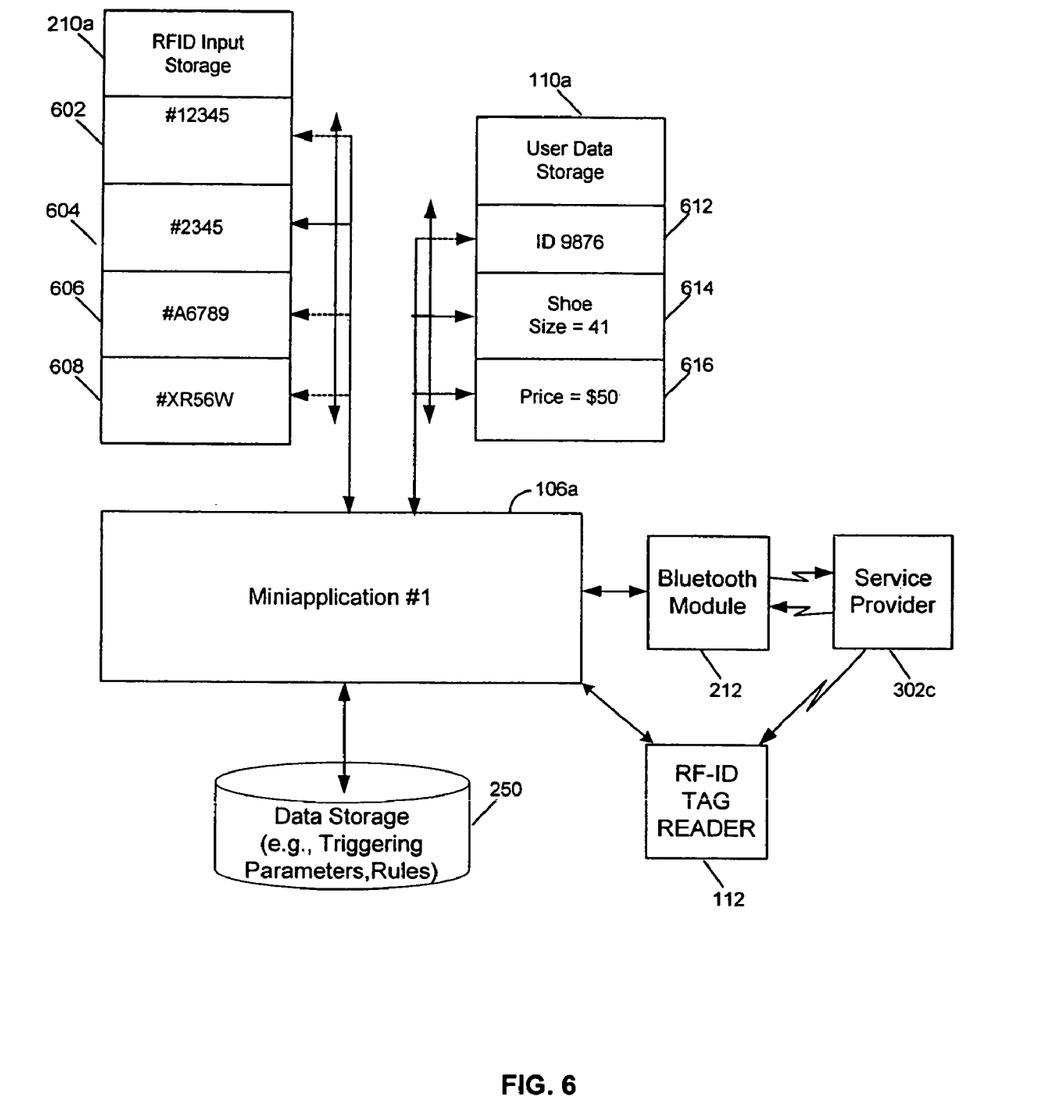
FIG. 6 is a block diagram illustrating an exemplary disposable mini-application for providing purchasing assistance to a user while the user is shopping in a shopping mall, a shop or any shopping service location thereof in accordance with one embodiment of the present invention.

FIG. 6 is a block diagram illustrating an exemplary disposable mini-application for providing purchasing assistance to a user while the user is shopping in a shopping mall, a shop or any shopping service location thereof in accordance with one embodiment of the present invention.

Referring briefly to FIG. 3, a mobile terminal 100 passes through entrance 312*a* of a shopping mall 300 and, in particular, passes within proximity of data transfer node 314*a*. In one embodiment, node 314*a* includes a Bluetooth module, an RF-ID tag reader and an RF-ID tag for data transfer with one or more mobile terminals 100. In one embodiment, the RF-ID tag reader of node 314*a* detects an RF-ID tag 110 of mobile terminal 100 and, in response, transmits a message to terminal 100 via a Bluetooth connection to advise the user of the availability of a disposable mini-application that can assist her in making purchases at shops 302*a–e*, 306 and using kiosk 320 within the mall. Upon receiving an indication of user acceptance, the disposable shopping mini-application is downloaded from node 314*a* to terminal 100 via the Bluetooth connection. In the embodiment illustrated in FIG. 3, each shop 302*a–e* in mall 300 is associated with its own data transfer node 304*a–e*. As mentioned above, in an exemplary embodiment, each node 302*a–e* also comprises a Bluetooth connection, an RF-ID tag reader and an RF-ID tag for data transfer with mobile terminals 100, as will be discussed further below.

Turning now to FIG. 6, disposable shopping mall mini-application 106*a*, which has been downloaded from node 314*a*, is shown together with data storage 250 in the mobile terminal 100, wherein trigger parameters and rules for activation, deactivation and deletion of the disposable mini-application are stored.

In the exemplary embodiment shown in FIG. 6, the trigger parameters for activation may include an RF-ID number list (not shown) of the ID numbers of the RF-ID tags of all data transfer nodes in the shopping mall including nodes 304*a–e* corresponding to shops 302*a–e* together with keywords (not shown) associated with the services and/or goods offered by each shop. The RF-ID number list preferably also includes the identification numbers of RF-ID tags associated with kiosk 320 and any information, such as keywords, concerning good/services available at shops 306 associated therewith. A rule for activation of the disposable mini-application may be that one or more of the keywords associated with a received RF-ID tag identification number matches an item that is on the user's electronic shopping list that is stored in user data storage 108*a* of mobile terminal 100.

A trigger parameter for de-activation or deletion of the disposable shopping mall mini-application may be a list of RF-ID identification numbers of data transfer nodes 314*a–c*, which are situated near mall exits 312*a–c*. An exemplary rule for deactivation and/or deletion may be the receipt of one of the RF-ID numbers for nodes 314*a–c* indicating that the user has, or is about to, leave the mall either alone or in combination with other trigger data such as user input confirming de-activation and/or deletion.

As discussed above, housekeeping means 206 extracts the trigger parameters and rules from the disposable mini-application and then (1) monitors RF-ID tag storage 210*a* of mobile terminal 100 for satisfaction of a trigger parameter—namely, for receipt of an identification number of an RFID tag that matches an identification number in the downloaded RF-ID number list and (2) determines whether a rule for activation, deactivation or deletion has been met. As shown in FIG. 6, RF-ID tag number input storage 210*a* may buffer a plurality of RF-ID tag identification numbers (602–608) received via RF-ID tag reader 112.

In the example shown in FIG. 6, RF-ID tag reader 112 receives one or more identification numbers from various RF-ID tags in the mall, including identification number "2345". The housekeeping means 206 continuously compares the RF-ID tag numbers that it is receiving against the list of RF-ID tag numbers that it has downloaded in connection with the disposable shopping mini-application. In this particular case, the comparison results in a determination that RF-ID tag number "2345" corresponds to a shop 302*c* by the name of "Susan's Shoes"; keywords: shoes, sneakers, sandals, boots, women.

Thereafter, housekeeping means 206 determines whether any of the keywords associated with the received RF-ID tag number "2345" match any of the items on the user's shopping list. In this example, the user's shopping list includes "shoes" as an item that the user intends to purchase. Since the rule for activation has been satisfied (i.e., a received RF-ID tag number matches one on the RF-ID number list and a keyword associated with the matching RF-ID tag number matches an item on the user's shopping list), housekeeping means 206 activates the shopping mall mini-application 106a. It will be appreciated that other data may be used for comparison with key words, and thus, for determining whether the mini-application should be activated. Such other data may include stored profile information indicating not only that the user is interested in purchasing shoes, but also that the user is a women, and thus, is likely to be interested in purchasing woman's shoes.

Once activated, the shopping mall mini-application 106a begins executing by formulating an inquiry either automatically or, with user assistance (elicited using, e.g., a series of prompts), for transmission to "Susan's Shoes" (i.e., shop 302c). The inquiry is formulated by selecting data from user data storage 108a for inclusion in the inquiry so that the user receives only information likely to be of interest to her. This user data may include a user ID 612, a shoe size 614, a price limit 616, a brand name (not shown) or the like.

In the present example, the shoe size 614 and price limit 616 are selected from user data storage and formulated into an inquiry. An inquiry may be "Do you have Size 41 shoes for $50 or less?" Once the inquiry has been formulated, disposable mini-application 106a uses Bluetooth module 212 of mobile terminal 100 to transmit the inquiry to shop 302c via data transfer node 304c. If "Susan's Shoes" shop 302c can meet the conditions set forth in the inquiry, a response is transmitted via node 304c to mobile terminal 100 for display to the user. The handling of the inquiries in the shop 302c may be automated or handled by a salesperson.

In the event that a response is not received from shop 320c after a predetermined period of time, housekeeping means 206 may deactivate the shopping mall mini-application and enter a wait state until trigger conditions for activation are satisfied. Additionally, as mentioned above, upon receipt of a trigger parameter such as an RF-ID tag number for any one of nodes 314a–c, which corresponds to a mall exit, thus indicating that the user is about to leave or has left the mall, housekeeping means 206 may delete the shopping mall mini-application from memory. This may occur either automatically or upon receiving a deletion confirmation from the user, depending upon the trigger parameter and rule for deletion.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

We claim:

1. A method for a mobile terminal, comprising:
    downloading over a wireless connection an executable software item including at least one condition for deletion of the executable software item, wherein the executable software item enables access over a short range wireless connection to information concerning at least one of goods or services when the mobile terminal is within a specified location associated with a short range wireless system;
    storing the executable software item including the condition for deletion of the executable software item in storage of the mobile terminal; and
    if the condition for deletion of the executable software item is satisfied, deleting the executable software item from storage of the mobile terminal.

2. The method of claim 1 wherein the mobile terminal is a mobile telephone or a mobile handset.

3. The method of claim 1 wherein the mobile terminal has communications capabilities comprising one or more of cellular, local area wireless, short range wireless and RFID.

4. The method of claim 1 further comprising:
    receiving a message concerning an executable software item that is available for downloading.

5. The method of claim 4 wherein the message is associated with a context of the user.

6. The method of claim 4 further comprising:
    filtering the message in accordance with a context of the user; and
    if the message matches the user's context, notifying the user of the message.

7. The method of claim 4 further comprising:
    determining requirements for downloading of the executable software item; and
    if capabilities of the mobile terminal meet the requirements, downloading the executable software item to the mobile terminal.

8. The method of claim 7 wherein the requirements for downloading of the executable software item comprises requirements for execution of the executable software item.

9. The method of claim 1 wherein the condition for deletion of the executable software item comprises a trigger parameter and a rule.

10. The method of claim 9 wherein a trigger parameter comprises at least partly one or more of a user's location, a date, a time and user data and a rule comprises one or more trigger parameters needed to effect deletion of the executable software item.

11. The method of claim 10 wherein the user's location is determined by the mobile terminal using an RF-ID system.

12. The method of claim 10 wherein user data comprises at least partly one or more of user profile data, calendar data, intents data and notes data.

13. The method of claim 1 wherein the condition for deletion of the executable software item comprises a timer value and deletion of the executable software item is initiated upon expiration of the timer value.

14. The method of claim 1 wherein the condition for deletion of the executable software item comprises a use counter and deletion of the executable software item is initiated upon the use counter reaching a predetermined number.

15. The method of claim 1 wherein the condition for deletion of the executable software item comprises a passage of a predetermined period of time without receipt of data relating to activation of the executable software item and the executable software item is deleted after expiration of the predetermined period of time.

16. The method of claim 15 wherein the predetermined period of time is specified in the executable software item as a condition for deletion of the executable software item.

17. The method of claim 1 wherein the condition for deletion comprises a determination that the executable software item is obsolete.

18. The method of claim 1 further comprising:
maintaining, in storage, data associated with the executable software item after deletion of the executable software item from storage.

19. The method of claim 18 wherein the storage is in the mobile terminal.

20. The method of claim 18 wherein the storage is in a service provider's data base.

21. The method of claim 20 wherein the data associated with the executable software item is data for use by the service provider in personalizing an executable software item when next downloaded by the mobile terminal.

22. The method of claim 18 wherein the data maintained in storage comprises data generated during execution of the executable software item.

23. The method of claim 1, further comprising:
activating execution of the downloaded executable software item at the specified location for accessing the at least one of goods or services over the short range wireless connection.

24. The method of claim 1, wherein the condition for deletion of the executable software item comprises that the mobile terminal has departed or is about to depart from the specified location associated with the short range wireless system.

25. A method for a mobile terminal, comprising:
downloading over a wireless connection an executable software item together with trigger conditions for activation and deletion of the executable software item, wherein the executable software item enables access over a short range wireless connection to information concerning at least one of goods or services when the mobile terminal is within a specified location associated with a short range wireless system;
storing the executable software item together with the trigger conditions for activation and deletion of the executable software item in storage of the mobile terminal;
if a trigger condition for activation of the executable software item is satisfied, activating the executable software item; and
if a trigger condition for deletion of the executable software item is satisfied, deleting the executable software item from storage of the mobile terminal.

26. The method of claim 25 wherein the mobile terminal is a mobile telephone or a mobile handset.

27. The method of claim 25 wherein the executable software item is downloaded to the mobile terminal only if a pre-condition for downloading is satisfied.

28. The method of claim 25 further comprising:
if the trigger condition for activation of the executable software item is not satisfied, then entering a wait state until the trigger condition for activation is satisfied.

29. The method of claim 25 wherein the trigger condition for deletion of the executable software item comprises whether the trigger condition for activation has not been satisfied within a predetermined period of time.

30. The method of claim 29 wherein the predetermined period of time is specified in the application as a trigger condition for activation of the executable software item.

31. The method of claim 25 wherein the trigger condition for activation comprises a trigger parameter and a rule.

32. The method of claim 31 wherein a trigger parameter comprises at least partly one or more of a user's location, a date, a time and user data and a rule comprises one or more trigger parameters needed to effect activation of the executable software item.

33. The method of claim 32 wherein the user's location is determined by the mobile terminal using an RF-ID system.

34. The method of claim 32 wherein user data comprises at least partly one or more of user profile data, calendar data, intents data and notes data.

35. The method of claim 31 wherein a trigger parameter for activation comprises another executable software item that is present in the mobile terminal.

36. The method of claim 25, wherein the condition for deletion of the executable software item comprises that the mobile terminal has departed or is about to depart from the specified location associated with the short range wireless system.

37. A method for a mobile terminal, comprising:
downloading a first executable software item upon entry of the mobile terminal into a first location together with a trigger condition for deletion of the first executable software item;
downloading a second executable software item upon entry of the mobile terminal into a second location together with a trigger condition for deletion of the second executable software item;
monitoring for trigger data that satisfies the trigger condition for deletion of the second executable software item; and
deleting the second executable software item upon detection of trigger data that satisfies the trigger condition for deletion of the second executable software item.

38. The method of claim 37 wherein the mobile terminal is a mobile telephone or a mobile handset.

39. The method of claim 37 wherein monitoring for trigger data that satisfies the trigger condition for deletion of the second executable software item and deletion of the second executable software item are performed by the first executable software item.

40. The method of claim 37 further comprising:
upon departure of the mobile terminal from the second location, the first executable software item deleting the second executable software item.

41. The method of claim 37 further comprising:
upon deletion of the second executable software item, the first executable software item deleting itself.

42. The method of claim 37 further comprising:
upon departure of the mobile terminal from the first location, the first executable software item deleting itself.

43. The method of claim 37 wherein the second location is different than the first location.

44. The method of claim 37 further comprising:
the first executable software item downloading the second executable software item based on a context of the user.

45. The method of claim 44 wherein the user's context comprises user data.

46. The method of claim 45 wherein the user data comprises one or more of user profile data, calendar data, intentions data and notes data.

47. The method of claim 37 further comprising:
the first executable software item downloading the second executable software item based on capabilities of the mobile terminal.

48. The method of claim 37 further comprising:
the first executable software item advising the user that the second executable software item is available for downloading to the mobile terminal.

49. A mobile terminal, comprising:
a memory device for storing a program; and
a processor in communication with the memory device, the processor operative with the program to:
  download over a wireless connection an executable software item comprising a condition for deletion of the executable software item, wherein the executable software item enables access over a short range wireless connection to information concerning at least one of goods or services when the mobile terminal is within a specified location associated with a short range wireless system;
  store the executable software item comprising the condition for deletion of the executable software item in storage of the mobile terminal; and
  if the condition for deletion of the executable software item is satisfied, delete the executable software item from storage of the mobile terminal.

50. The apparatus of claim 49, wherein the processor is further operative with the program to:
activate execution of the downloaded executable software item at the specified location for accessing the at least one of goods or services.

51. The method of claim 49, wherein the condition for deletion of the executable software item comprises that the mobile terminal has departed or is about to depart from the specified location associated with the short range wireless system.

52. A mobile terminal, comprising:
a memory device for storing a program; and
a processor in communication with the memory device, the processor operative with the program to:
  download over a wireless connection an executable software item together with trigger conditions for activation and deletion of the executable software item, wherein the executable software item enables access over a short range wireless connection to information concerning at least one of goods or services when the mobile terminal is within a specified location associated with a short range wireless system;
  store the executable software item together with the trigger conditions for activation and deletion of the executable software item in storage of the mobile terminal;
  if a trigger condition for activation of the executable software item is satisfied, activate the executable software item; and
  if a trigger condition for deletion of the executable software item is satisfied, delete the executable software item from storage of the mobile terminal.

53. The method of claim 52, wherein the trigger condition for deletion of the executable software item comprises that the mobile terminal has departed or is about to depart from the specified location associated with the short range wireless system.

54. A mobile terminal, comprising:
a memory device for storing a program; and
a processor in communication with the memory device, the processor operative with the program to:
  download a first executable software item upon entry of the mobile terminal into a first location together with a trigger condition for deletion of the first executable software item;
  download a second executable software item upon entry of the mobile terminal into a second location together with a trigger condition for deletion of the second executable software item;
  monitor for trigger data that satisfies the trigger condition for deletion of the second executable software item; and
  delete the second executable software item upon detection of trigger data that satisfies the trigger condition for deletion of the second executable software item.

55. A mobile terminal, comprising:
a memory device for storing a program; and
a processor in communication with the memory device, the processor operative with the program to:
  download an executable software item upon entry of the mobile terminal into a location associated with a short range wireless system;
  store the executable software item in memory;
  detect that the mobile terminal has departed or is about to depart from the location associated with the short range wireless system; and
  in response to detecting that the mobile terminal has departed or is about to depart from the location associated with the short range wireless system, delete the executable software item from memory.

56. A method for a mobile terminal, comprising:
downloading an executable software item upon entry of the mobile terminal into a location associated with a short range wireless system;
storing the executable software item in memory;
detecting that the mobile terminal has departed or is about to depart from the location associated with the short range wireless system; and
in response to detecting that the mobile terminal has departed or is about to depart from the location associated with the short range wireless system, deleting the executable software item from memory.

57. A computer readable medium having computer executable program code recorded thereon, which, when executed, causes a computer to:
  download an executable software item upon entry of the mobile terminal into a location associated with a short range wireless system;
  store the executable software item in memory;
  detect that the mobile terminal has departed or is about to depart from the location associated with the short range wireless system; and
  in response to detecting that the mobile terminal has departed or is about to depart from the location associated with the short range wireless system, delete the executable software item from memory.

* * * * *

UNITED STATES PATENT AND TRADEMARK OFFICE
CERTIFICATE OF CORRECTION

PATENT NO. : 7,130,622 B2  Page 1 of 1
APPLICATION NO. : 11/143314
DATED : October 31, 2006
INVENTOR(S) : Marko Vanska, Sami Ranta and Raimo Malila It is certified that error appears in the above-identified patent and that said Letters Patent is hereby corrected as shown below:

Column 17, line 19: please delete "apparatus" and replace it with -- mobile terminal --;

Column 17, line 24: please delete "method" and replace it with -- mobile terminal --;

Column 17, line 52: please delete "method" and replace it with -- mobile terminal --.

Signed and Sealed this

First Day of July, 2008

JON W. DUDAS
*Director of the United States Patent and Trademark Office*